(12) United States Patent
Olfermann et al.

(10) Patent No.: US 10,559,796 B2
(45) Date of Patent: Feb. 11, 2020

(54) BATTERY CARRIER FOR A VEHICLE

(71) Applicant: Benteler Automobiltechnik GmbH, Paderborn (DE)

(72) Inventors: Thomas Olfermann, Salzkotten (DE); Christian Handing, Langenberg (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 64 days.

(21) Appl. No.: 15/914,805

(22) Filed: Mar. 7, 2018

(65) Prior Publication Data
US 2018/0269447 A1 Sep. 20, 2018

(30) Foreign Application Priority Data

Mar. 17, 2017 (DE) ........................ 10 2017 105 831

(51) Int. Cl.
*H01M 2/10* (2006.01)
*B60K 1/04* (2019.01)
*H01M 2/08* (2006.01)

(52) U.S. Cl.
CPC ............. *H01M 2/1094* (2013.01); *B60K 1/04* (2013.01); *H01M 2/08* (2013.01); *H01M 2/1077* (2013.01); *H01M 2/1083* (2013.01); *B60K 2001/0438* (2013.01); *B60Y 2410/125* (2013.01); *H01M 2220/20* (2013.01)

(58) Field of Classification Search
CPC ..................... H01M 2/1094; H01M 2/1016
See application file for complete search history.

(56) References Cited

U.S. PATENT DOCUMENTS

| | | | | |
|---|---|---|---|---|
| 5,906,899 | A * | 5/1999 | Noda ...................... | H01M 2/20 429/149 |
| 6,244,444 | B1 * | 6/2001 | Jacobus ............... | B65D 25/205 206/470 |
| 6,312,851 | B1 * | 11/2001 | Fukuda ............... | H01M 2/0242 429/120 |
| 2004/0029001 | A1 * | 2/2004 | Yamazaki ............. | H01M 2/021 429/176 |

FOREIGN PATENT DOCUMENTS

| | | |
|---|---|---|
| DE | 10 2010 026 612 A1 | 3/2011 |
| DE | 10 2010 011 890 A1 | 9/2011 |
| DE | 10 2014 203 507 A1 | 9/2014 |
| DE | 10 2015 207 746 A1 | 11/2015 |
| DE | 10 2014 225 845 A1 | 6/2016 |

* cited by examiner

*Primary Examiner* — Olatunji A Godo
(74) *Attorney, Agent, or Firm* — Holland & Hart LLP

(57) ABSTRACT

The disclosure relates to a battery carrier for accommodating at least one electric battery module in a vehicle. The battery carrier may include at least one first wall, at least one second wall arranged at an angle with respect to the first wall, wherein the second wall is joined to the first wall by a joining region, wherein an adhesive region is formed in the joining region, and the adhesive region is configured to condition the joining region for a materially bonded connection to a seal, and at least one seal materially bonded to the adhesive region in order to fluidically seal the joining region.

20 Claims, 6 Drawing Sheets

BATTERY CARRIER FOR A VEHICLE

CROSS-REFERENCE TO RELATED APPLICATIONS

This application claims priority to German patent application No. 10 2017 105 831.1, entitled "Batterieträger für ein Fahrzeug", and filed on Mar. 17, 2017 by the assignee of this application, the entire disclosure of which is incorporated by reference for all purposes.

BACKGROUND

The present disclosure relates to a battery carrier for at least one electric battery module in a vehicle, in particular in an electrically driven vehicle.

Usually battery modules arranged between the axles of the vehicle are used to supply electrical energy in electrically driven vehicles.

For the efficient production of such battery holders, profile elements can be used, which are described in the published document DE 10 2012 100 977 B3.

SUMMARY

The aim of the present disclosure is to produce an additional efficient battery carrier.

This aim is achieved by the features of the independent claims. Advantageous examples are the subject matter of the dependent claims, the description and the appended figures.

The present disclosure is based on the discovery that the above aim can be achieved with a battery carrier for accommodating at least one electric battery module, wherein the battery carrier is effectively fluidically sealed, in order to prevent fluid from coming in contact with the at least one electric battery module in a manner which impairs the functionality.

In this manner, the effective seal of the battery carrier can ensure an effective functionality of the electric battery module during the operation of the vehicle, and damage of the electric battery module and of the electronics can be avoided.

According to a first aspect, the disclosure relates to a battery carrier for accommodating at least one electric battery module in a vehicle, with at least one first wall, at least one second wall which is arranged at an angle with respect to the first wall, wherein the second wall is joined to the first wall by a joining region, wherein an adhesive region, which is configured to condition the joining region for a materially bonded connection to a seal, is formed in the joining region, and with at least one seal which is materially bonded to the adhesive region in order to fluidically seal the joining region.

Thereby, the advantage is achieved that the materially bonded connection of the seal to the adhesive region is ensured, that the seal is fastened particularly advantageously in the joining region and thus the seal can fluidically seal the joining region particularly advantageously.

In order to protect the at least one electric battery module in the battery carrier from fluid, it is advantageous to use seals which prevent that the fluid can penetrate into the battery carrier and damage the electric battery module. In particular in a metal battery carrier, in the case of a materially bonded connection between the seal and the metal battery carrier, it can become necessary to take precautions to improve the adhesion between the battery carrier and the seal, in order to prevent detachment of the seal during the operation of the vehicle.

In order to improve the adhesion between the battery carrier and the seal, the second wall is joined to the first wall by a joining region, wherein, in the joining region, an adhesive region is formed, which is configured to improve the effectiveness of the materially bonded connection, in particular a welded, glued or soldered connection, between the battery carrier and the seal. Thereby, an effective and stable fastening of the seal to the battery carrier during the operation of the vehicle can advantageously be ensured, without the seal becoming detached.

In an example, the at least one wall comprises a carrier bottom, and the at least one second wall comprises at least one side wall, wherein the at least one side wall laterally delimits the carrier bottom, and wherein the at least one side wall is joined to the carrier bottom by the joining region.

Thereby, the advantage is achieved that an advantageous battery carrier for accommodating the at least one electric battery module is provided. In particular, the battery module can be placed onto the carrier bottom, so that the carrier bottom contacts the battery module. Alternatively, the carrier bottom can close the battery carrier without the battery module contacting the carrier bottom, wherein here the at least one electric battery module can be fastened to the at least one side wall and/or to a carrier cover of the battery carrier.

In an example, the at least one first wall comprises a carrier cover and the at least one second wall comprises at least one side wall, wherein the at least one side wall laterally delimits the carrier cover, and wherein the at least one side wall is joined to the carrier cover by the joining region.

Thereby, the advantage is achieved that an advantageous battery carrier for accommodating the at least one battery module is provided. In particular, the carrier cover can be placed onto the battery module, so that the carrier cover contacts the battery module. Alternatively, the carrier cover can close the battery carrier without the battery module contacting the carrier cover, wherein here the at least one electric battery module can be fastened to the at least one side wall and/or to a carrier bottom of the battery carrier.

In an example, the at least one first wall comprises a side wall, and the at least one second wall comprises an additional side wall, wherein the side wall is joined to the additional side wall by the joining region.

Thereby, the advantage is achieved that an advantageous battery carrier for accommodating the at least one electric battery module is provided. In particular, the battery carrier can comprise several side walls, in particular four or six side walls, which in each case are joined to one another by a joining region. Thus, the battery module can advantageously be enclosed within the battery carrier by the side walls.

In an example, the adhesive region comprises an adhesive layer, wherein the adhesive layer comprises a plastic layer, a silane layer, a metalorganic layer, a titanium-zirconium layer and/or an anodized layer.

Thereby, the advantage is achieved that the adhesive layer comprising the plastic layer, the silane layer, the titanium-zirconium layer, the metalorganic layer and/or the anodized layer can advantageously be formed effectively in the joining region and enables an effective adhesion between the joining region and the seal. Here, the adhesive layer is connected, in particular, by material bonding to the joining region and thereby it can be fastened effectively in the joining region. In particular in the context of a plasma cleaning method, the adhesive layer can here be applied in the joining region, wherein starting materials for the adhesive layer, for example, an organosilicon compound, are added to the plasma here. The starting materials are fragmented by the plasma and deposited on a surface of the joining region as an adhesive layer.

In an example, the adhesive region is a plasma-cleaned region and/or a laser-cleaned region.

Thereby, the advantage is achieved that a plasma-cleaned and/or a laser-cleaned region in the joining region ensure(s) a durable effective adhesion between the joining region and the seal. By means of plasma cleaning or laser cleaning, contaminations on a surface of the joining region can be effectively removed, or a surface structure of the joining region can advantageously be conditioned for a materially bonded connection. Thereby, it can be ensured that the seal advantageously adheres in the joining region. Here, plasma cleaning and laser cleaning can also be combined in the context of a hybrid solution, wherein here the laser jet striking the joining region evaporates contaminations on the surface of the joining region, wherein the plasma encloses the laser beam and reacts with the evaporated contaminations, whereby a renewed contamination of the cleaned surfaces can be prevented.

In an example, the joining region comprises a materially bonded connection, in particular a welded connection or a soldered connection.

Thereby, the advantage is achieved that a materially bonded connection provides a particularly advantageous and stable connection between the at least one second wall and the at least one first wall. During the welding or soldering of the first wall to the second wall, the joining region is configured as a welded connection or as a soldered connection.

In an example, the joining region comprises a force-locking connection and/or a positive connection, in particular a rivet connection, screw connection and/or clinch connection.

Thereby, the advantage is achieved that a materially bonded connection provides a particularly advantageous and stable connection between the at least one first wall and the at least one second wall. If the joining region comprises a rivet connection, screw connection and/or clinch connection, an easily produced joining is provided between the first and the second wall, which is mechanically stable.

In an example, the joining region comprises a joining connection between the at least one first wall and the at least one second wall, wherein the adhesive region is formed on the joining connection.

Thereby, the advantage is achieved that the adhesive region formed on the joining connection ensures a particularly effective fluidic seal by means of the seal.

In an example, the joining region is formed at least in sections between the first wall and the second wall.

Thereby, the advantage is achieved that a particularly effective fluidic seal of the battery carrier or of the joining region is made possible. Due to the fact that the joining region is formed at least in sections between the first wall and the second wall, the adhesive region formed in the joining region is also formed at least in sections. Thereby, the adhesive region is not limited to the direct contact region between the first wall and the second wall, instead it can also comprise regions of the first wall and of the second wall, which are arranged spaced from the direct contact region on the first wall and/or on the second wall. If the seal is materially bonded to this enlarged adhesive region, a particularly effective fluidic seal of the joining region is ensured, since the spatial extent of the seal goes beyond the direct contact region between the first wall and the second wall.

In an example, the seal is formed from at least one plastic, in particular an elastomer, or from a single-component or two-component melt or epoxy resin adhesive which is applied, in particular, in the form of a paste.

Thereby, the advantage is achieved that a seal fabricated from a plastic can be produced simply and provided advantageously in the form needed, in order to ensure an effective fluidic seal. Here, a solid seal fabricated from an elastomer is characterized in particular by a resilient deformability, whereby a corresponding resilient seal can be positioned particularly advantageously in the joining region between the first wall and the second wall. When a seal which can be applied in the form of a paste, in particular of an adhesive, is used, the result is a particularly flexible application, and the installation process is simplified overall. In addition, structural functions are also performed by the adhesives, and, as a result, the battery carrier becomes more stable.

In an example, the second wall is configured as a side wall with a side wall lower side, and the first wall is configured as a carrier bottom with a bottom upper side, wherein the side wall lower side is placed onto the bottom upper side, in order to connect the side wall to the carrier bottom.

Thereby, the advantage is achieved that a particularly advantageous connection between the side wall and the carrier bottom is achieved. Here, the side wall lower side is placed in particular onto a bottom upper side of a bottom edge of the carrier bottom, in order to advantageously connect the side wall to the carrier bottom. In particular, the bottom edge of the carrier bottom here is flush with a side wall outer side of the side wall, which faces away from the battery carrier.

In an example, the adhesive region is formed between a side wall inner side of the side wall, which faces the battery carrier, and the carrier bottom, or the adhesive region is formed between a side wall outer side of the side wall, which faces away from the battery carrier, and the carrier bottom.

Thereby, the advantage is achieved that either an adhesive region formed in an inner region of the battery carrier or an adhesive region formed in an outer region of the battery carrier ensures an effective attachment of the seal to the battery carrier and thus an effective fluidic seal of the joining region.

In an example, the second wall is configured as a side wall with a side wall inner side, wherein the first wall is configured as a carrier bottom, wherein a flange is arranged on the side wall inner side, wherein the carrier bottom is placed onto the flange, in order to connect the side wall to the carrier bottom.

Thereby, the advantage is achieved that the carrier bottom rests in a stable manner on the flange, and the flange thereby ensures an effective connection between the side wall and the carrier bottom.

In an example, the adhesive region is formed between a side wall inner side which faces the battery carrier and the carrier bottom.

Thereby, the advantage is achieved that a seal materially bonded to the adhesive region can fluidically seal the joining region particularly effectively, wherein the carrier bottom here rests on the flange.

In an example, the second wall comprises a side wall with a side wall upper side, wherein, on the side wall upper side, an upper side flange is formed, which extends along the side wall upper side, wherein the upper side flange extends, in particular, parallel to the first wall.

Thereby, the advantage is achieved that the upper side flange enables an effective spatial limitation of an inner region of the battery carrier with respect to an outer region of the battery carrier.

In an example, in the upper side flange, openings are formed, which can be passed through by fastening elements, in order to fasten the battery carrier in the vehicle.

Thereby, the advantage is achieved that the openings enable an effective fastening of the battery carrier in the vehicle.

In an example, the at least one wall is configured as a carrier bottom, and, on a bottom upper side of the carrier bottom, which faces the battery carrier, recesses which are limited by elevations are arranged, wherein the recesses ensure an effective positioning of the at least one electric battery module in the battery carrier and, in particular, provide additional installation space for a heat exchanger.

Thereby, the advantage is achieved that the recesses ensure an effective positioning of the at least one electric battery module in the battery carrier, and a heat exchanger is advantageously arranged on the carrier bottom.

In an example, the at least one first wall is configured as a carrier bottom, and, on a bottom upper side of the carrier bottom, which faces the battery carrier, additional openings are formed, which can be passed through by additional fastening elements, in order to enable an effective fastening of the battery carrier to the vehicle.

In an example, the at least one second wall extends at a right angle or at an angle with respect to the at least one first wall.

Thereby, the advantage is achieved that the first wall or the second wall effectively limits the at least one electric battery module accommodated in the battery carrier.

In an example, the at least one second wall and/or the at least one first wall is/are formed in each case as a single piece, and/or the at least one second wall and/or the at least one first wall comprise(s) a metal, in particular aluminum.

Thereby, the advantage is achieved that a second wall, in particular a side wall, which is formed as a single piece, or a first wall, in particular a carrier bottom, which is formed as a single piece, ensures a particularly stable component which is easy to fabricate. A metal such as aluminum, for example, is suitable here, in particular since it is mechanically stable, easy to fabricate and corrosion-resistant. In particular, the side wall is formed as a side wall frame which extends as a single piece around the carrier bottom and is formed from a single extruded profile.

In an example, the at least one first wall comprises a carrier bottom, and the at least one second wall comprises a side wall frame, wherein the side wall frame comprises at least four side walls which in each case laterally limit the carrier bottom and are joined to the carrier bottom in each case by a joining region, wherein, in the joining regions, in each case an adhesive region is formed, which is configured to condition the respective joining region for a materially bonded connection to a seal, and wherein the battery carrier comprises at least four seals which in each case are materially bonded to the respective adhesive region, in order to fluidically seal the respective joining region.

Thereby, the advantage is achieved that the at least four side walls effectively limit the carrier bottom laterally, whereby the carrier bottom of the battery carrier is surrounded peripherally by the side walls. Thereby, a particularly effective accommodation of the at least one electric battery module in the battery carrier can be ensured.

According to a second aspect, the disclosure relates to a method for producing a battery carrier for accommodating at least one electric battery module in a vehicle, wherein the method comprises the following steps, joining of at least one second wall to at least one first wall by a joining region, wherein the second wall is arranged at an angle with respect to the first wall, forming of an adhesive region in the joining region, in order to condition the joining region for a materially bonded connection to a seal, and material bonding of the seal to the adhesive region, in order to fluidically seal the joining region.

Thereby, the advantage is achieved that, by forming the adhesive region in the joining region, it is ensured that the seal can fluidically seal the joining region particularly effectively.

In an example, an adhesive layer is applied in the joining region, in order to form the adhesive region, wherein the adhesive layer comprises a plastic layer, a silane layer, a metalorganic layer, a titanium-zirconium layer and/or an anodized layer.

Thereby, the advantage is achieved that an adhesive layer such as, for example, a plastic layer, a silane layer, a metalorganic layer, a titanium-zirconium layer and/or an anodized layer ensures advantageous adhesion properties for material bonding to the seal.

In an example, the adhesive region in the joining region is formed by a plasma cleaning method and/or a laser cleaning method.

Thereby, the advantage is achieved that a plasma cleaning method and/or a laser cleaning method enable(s) a particularly effective forming of the adhesive region in the joining region.

BRIEF DESCRIPTION OF THE DRAWINGS

Examples of the principles of the present disclosure are described referring to the accompanying figures.

DETAILED DESCRIPTION OF THE DRAWINGS

Figure 1:
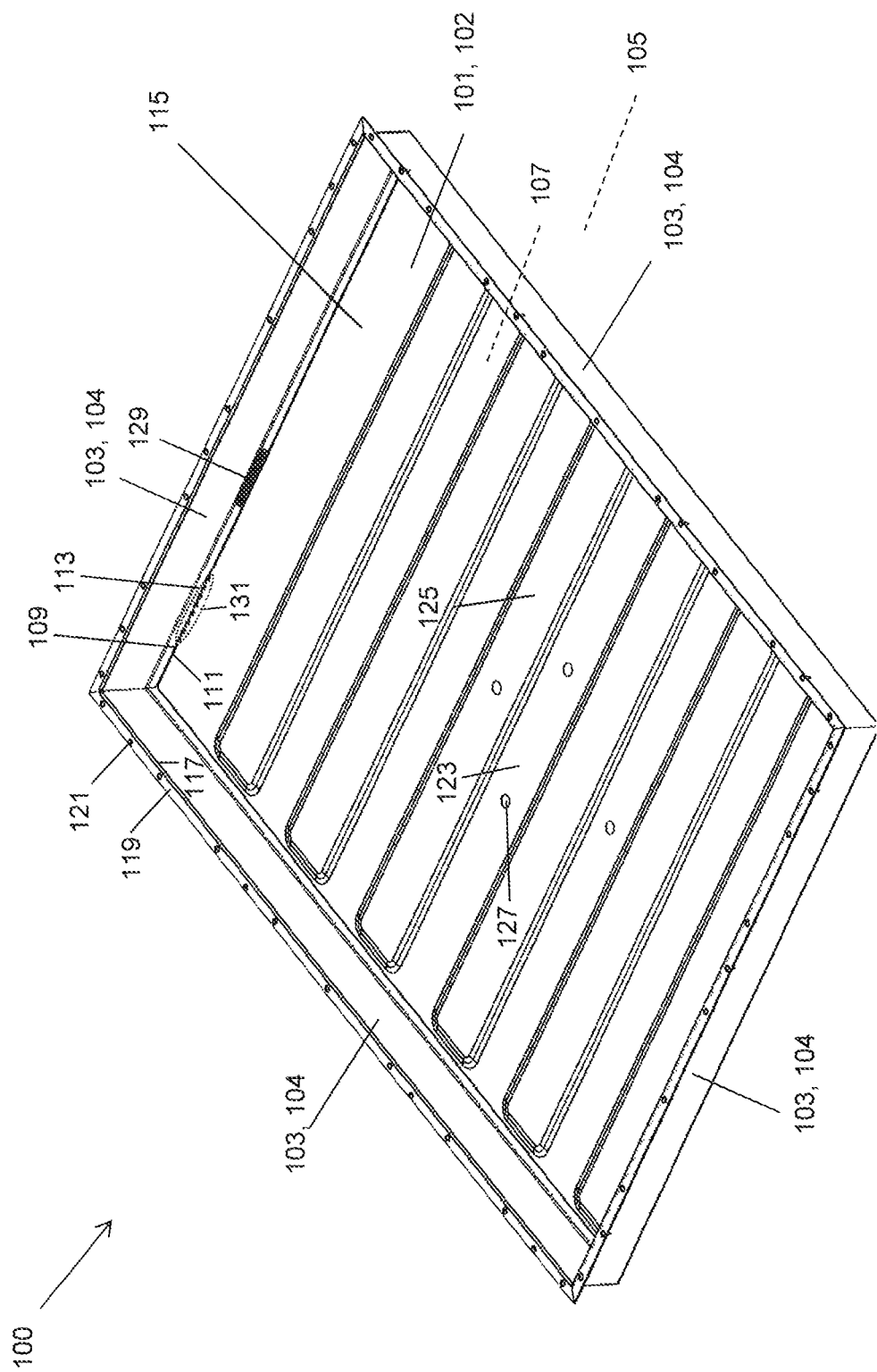
FIG. 1 shows a battery carrier in a perspective view according to a first example.

FIG. 1 shows a perspective view of a battery carrier 100 for accommodating at least one electric battery module in a vehicle according to a first example. The battery carrier 100 comprises a first wall 101 which comprises a carrier bottom 102 for accommodating the at least one electric battery module and it comprises four second walls 103, in particular four side walls 104, which laterally limit the carrier bottom 102. The side walls 104 thus delimit an outer region 105 of the battery carrier from an inner region 107 of the battery carrier 100.

For this purpose, at least one electric battery module (not shown in FIG. 1) can be accommodated in the battery carrier 100 and, in particular, be placed onto the carrier bottom 102 of the battery carrier 100 or be arranged spaced by means of the carrier bottom 102 from the outer region 105. If several electric battery modules are placed onto the carrier bottom 102, the carrier bottom 102 can comprise a plurality of module accommodations which are separated from one another by partition walls and thus form niches or troughs for the respective electric battery modules. The partition walls can here extend along a longitudinal direction, a transverse direction and/or a diagonal direction on the carrier bottom 101.

The battery carrier 100 can have another function and be configured as a lower bottom plate of the motor vehicle, which ensures an underride protection for the motor vehicle.

The battery carrier 100, in particular the carrier bottom 102 and/or the side walls 104, is molded in particular from a heat conducting metal such as aluminum, for example. Thereby, thermal coupling between the battery carrier 100 and the at least one electric battery module accommodated in the battery carrier 100 can be ensured. Due to the thermal coupling, the battery carrier 100 is configured to cool and/or to heat the at least one electric battery module for temperature adjustment, in particular for cooling and/or heating, when the temperature of the battery carrier 100 is different from the temperature of the at least one electric battery module.

The battery carrier 100 enables an effective accommodation of the at least one electric battery module, so that the electric battery module can be protected effectively against damage during the operation of the vehicle and be accommodated in a stable manner in the battery carrier 100.

In order to produce the battery carrier 100, the side walls 104 in each case comprise a side wall lower side 109 which is connected in each case to a lateral bottom edge 111 of the carrier bottom 102. Here, the respective side wall 104 is joined to the carrier bottom 102 in each case by a joining region 113. The respective joining region 113 according to FIG. 1 is not limited only to a joining connection, in particular a joining seam which extends in each case at least in sections between a side wall 104 and a lateral bottom edge 111 of the carrier bottom 102. In particular, the joining region 113 according to FIG. 1 also extends to regions of the respective side wall 104 and of the carrier bottom 102, which abut against the joining connection, in particular the joining seam. In the representation selected in FIG. 1, the joining region 113 is represented diagrammatically only in sections.

The side walls 104 can be materially bonded to the carrier bottom 102, in particular welded or soldered. In the case of a welded connection, the joining region 113 is configured in particular as a welded seam. Here, for example, a MIG welding method can be used, in which an electric arc welding process is carried out using inert gases.

The side walls 104 can be connected to the lateral bottom edges 111 of the carrier bottom 102 alternatively or additionally by force-locking and/or positive connection. Here, the joining region 113 between the side walls 104 and the carrier bottom 102 can comprise, in particular, a screw connection, a rivet connection and/or a clinch connection.

In the representation shown in FIG. 1, the side wall lower sides 109 of the side walls 104 are placed onto a bottom upper side 115 of the carrier bottom 102, in order to connect the side walls 104 to the carrier bottom 102. Alternatively, the carrier bottom 102 can also be placed onto flanges which are not shown in FIG. 1 and which are arranged on the side walls 104, in order to connect the side walls 104 to the carrier bottom 102.

The side walls 104 in each case comprise a side wall upper side 117 which faces away from the side wall lower side 109. On the side wall upper side 117 of the respective side wall 104, in each case an upper side flange 119 is formed, which extends along the respective side wall upper side 117. In particular, the upper side flange 119 here extends parallel to the carrier bottom 102. In the upper side flange 119, a plurality of openings 121 are formed, which can be passed through by fastening elements which are not shown in FIG. 1, in order to fasten the battery carrier 100 to the vehicle.

On a bottom upper side 115 of the carrier bottom 102, recesses 123 are arranged, which are separated from one another by elevations 125, wherein the recesses 123 enable an effective positioning of the electric battery modules in the battery carrier 100. On the bottom upper side 115 of the carrier bottom 102, additional openings 127 are formed, which can be passed through by additional fastening elements, in order to fasten the battery carrier 100 to the vehicle.

In order to protect the inner region 107 of the battery carrier 100 against damage and contaminations which can penetrate in particular from below into the inner region 107, it is important that the joining regions 113 are fluidically tight between the side walls 104 and the lateral bottom edges 111 of the carrier bottom 102. For this purpose, in each case, a seal 129 is materially bonded to the respective joining region 113, for example, by welding, soldering or gluing, in order to ensure an effective and durable fluidic seal of the joining regions 113. The seal 129 is represented only diagrammatically and in sections in FIG. 1.

Since, in a battery carrier 100 consisting of a metal, in particular of aluminum, a materially bonded connection attached thereto often adheres insufficiently, it is often necessary to pretreat the surface needed for the materially bonded connection, in order to ensure an adhesion of the materially bonded connection, which is effective and reliable over the lifespan of the battery, on the surface or in the joining region 113.

In order to ensure an effective materially bonded connection of the seal 129 in the joining region 113, an adhesive region 131 is formed in the respective joining region 113. The adhesive region 131 here extends in particular at least in sections towards the respective side wall 104 and the carrier bottom 102. An adhesive region 131 is represented only diagrammatically and in sections in FIG. 1.

The adhesive region 131 can be a plasma-cleaned and/or a laser-cleaned region which is formed by means of a plasma cleaning method and/or a laser cleaning method. In a plasma cleaning method or a laser cleaning method, the joining region 113 is treated with a plasma or with a laser beam. The plasma or the laser here removes contaminations on the surface and modifies the surface structure in the joining region 113 in such a manner that the adhesive properties of the joining region 113 are improved, in particular in the case of a materially bonded connection of a seal 129 in the joining region 113. Here, a plasma cleaning method and a laser cleaning method can also be combined.

By means of the plasma cleaning method and/or the laser cleaning method, the adhesive region 131 is formed in the joining region 113, so that the seal 129 can subsequently be connected effectively to the adhesive region 131, in order to ensure an effective fluidic seal of the joining region 113.

The adhesive region 131 can comprise an adhesive layer which comprises a plastic layer, a silane layer, a metalorganic layer, a titanium-zirconium layer and/or an anodized layer and which is applied in the joining region 13. Here, the adhesive layer can be applied in particular in the context of a plasma cleaning method, wherein the starting materials are supplied to the plasma here.

In each case, as soon as the adhesive region 131 is formed in the joining region 113, seals 129 can be introduced, or applied in the pasty state, between the respective side walls 104 and the carrier bottom 102, wherein, particularly advantageously, the seals can be materially bonded to the adhesive region 131. In particular, gluing onto the adhesive region 131 occurs. Thereby, a particularly effective fluidic seal between the side walls 104 and the carrier bottom 102 is achieved.

Figure 2:
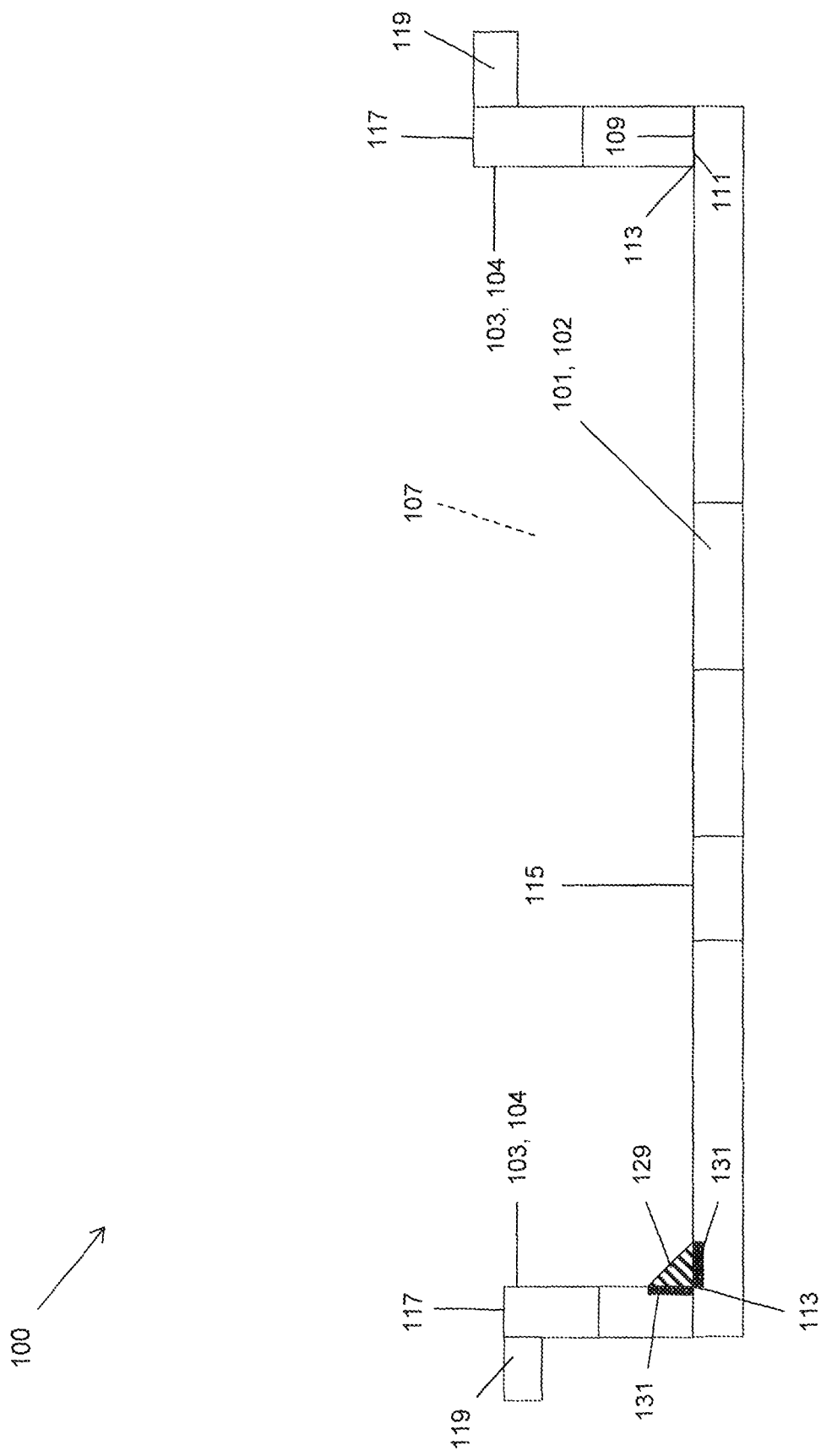
FIG. 2 shows a battery carrier in a cross-sectional view according to the first example.

FIG. 2 shows a battery carrier 100 in a cross-sectional view according to the first example. The battery carrier 100 comprises a first wall 101 which comprises a carrier bottom 102 for accommodating the at least one electric battery module and it comprises four second walls 103, in particular four side walls 104, which are configured to laterally limit the carrier bottom 102. In the view represented in FIG. 2, only the side walls 104 of the battery carrier 100, which are arranged on the longitudinal sides of the battery carrier 100, are represented.

The respective side wall lower sides 109 of the side walls 104 here rest on the respective lateral bottom edges 111 of the carrier bottom 102, wherein, in each case, a joining region 113 is formed between the respective side wall 104 and the respective lateral bottom edge 111 of the carrier bottom 102.

In the respective joining region 113, an adhesive region 131 is formed. A seal 129 is materially bonded to the respective adhesive region 131, in order to fluidically seal the respective joining region 113. In the view shown in FIG. 2, only a seal 129 which is connected to an adhesive region 131 is represented.

Figure 3:
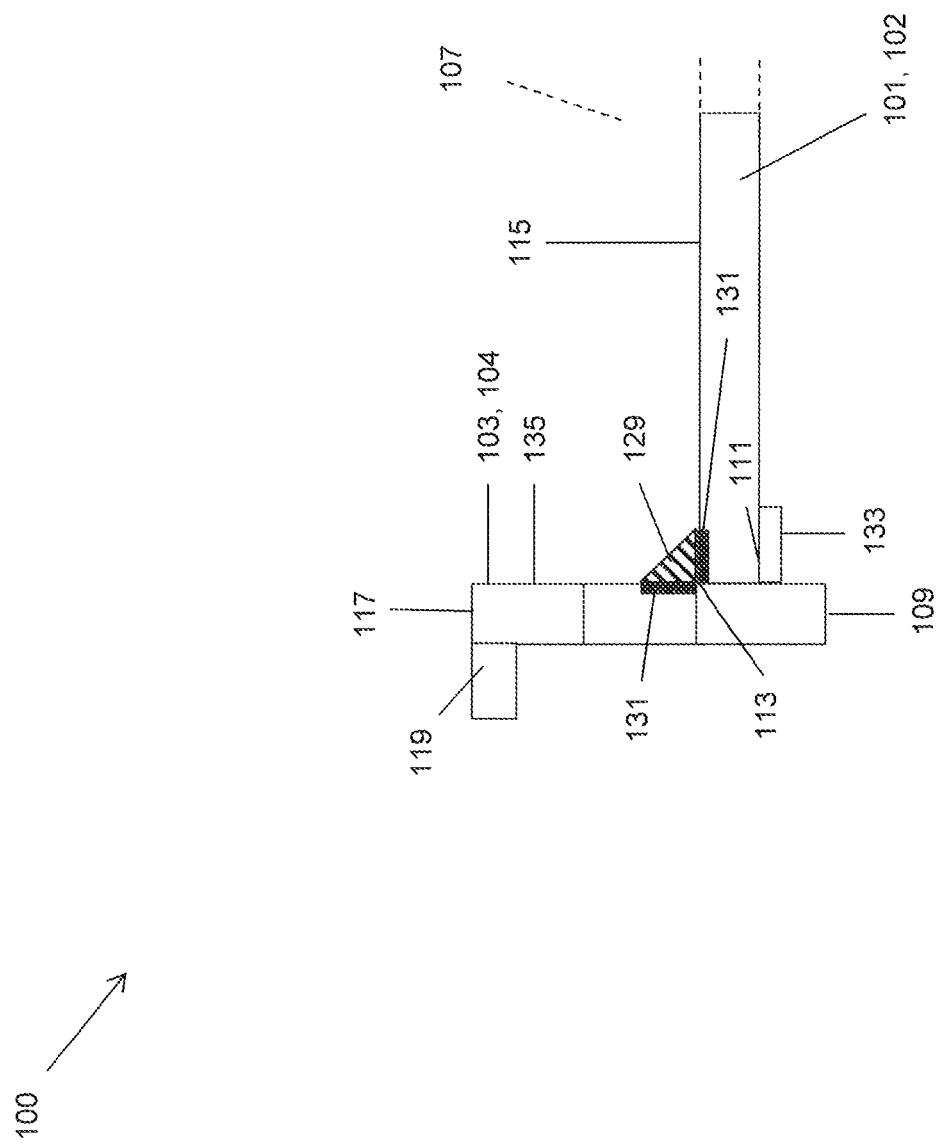
FIG. 3 shows a battery carrier in a cross-sectional view according to a second example.

FIG. 3 shows a battery carrier 100 in a cross-sectional view according to a second example. The battery carrier 100 comprises a first wall 101 which comprises a carrier bottom 102 for accommodating the at least one electric battery module and it comprises second walls 103, in particular four side walls 104 which are configured to limit an inner region 107 of the battery carrier 100.

On the side walls 104, in each case a flange 133 is formed, in particular extruded as a single piece, wherein the respective lateral bottom edge 111 of the carrier bottom 102 is applied onto the flange 133, in order to connect the carrier bottom 102 to the side walls 104.

The side wall 104 is joined to the carrier bottom 102 by a joining region 113. The respective side walls 104 and the respective lateral bottom edges 111 of the carrier bottom 102 here comprise in each case an adhesive region 131, wherein the adhesive region 131 is formed between a side wall inner side 135 of the side wall 104, which faces the battery carrier, and the carrier bottom 102. The seals 129 are materially bonded to the respective adhesive regions 131, in order to fluidically seal the respective joining regions 113. In the view shown in FIG. 3, only one seal 129 is represented, which is connected to an adhesive region 131.

Figure 4:
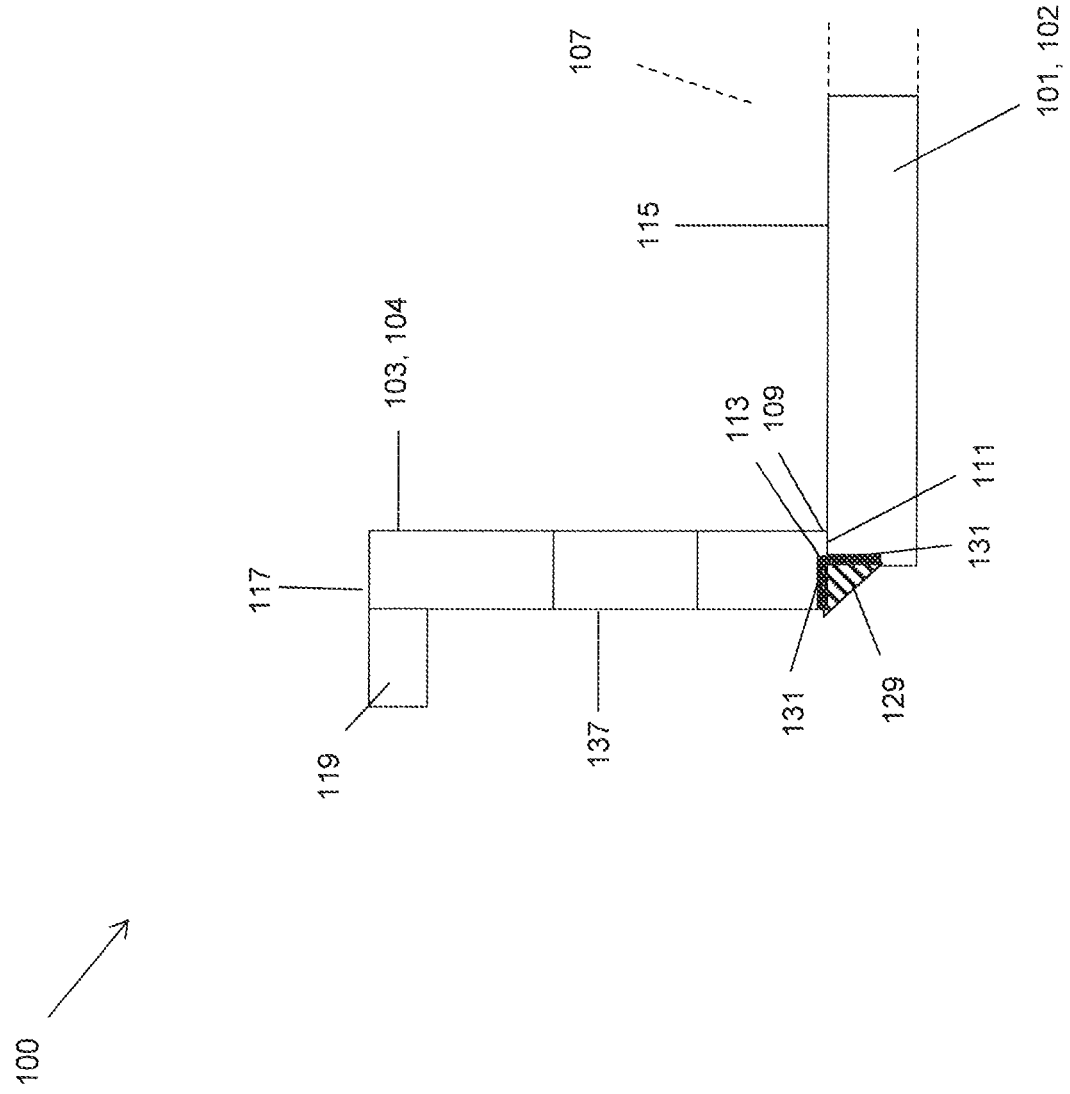
FIG. 4 shows a battery carrier in a cross-sectional view according to a third example.

FIG. 4 shows a battery carrier 100 in a cross-sectional view according to a third example. The respective side wall lower sides 109 of the side walls 104 here rest on the respective lateral bottom edges 111 of the carrier bottom 102, wherein, in each case, a joining region 113 is formed between the respective side wall 104 and the respective lateral bottom edge 111 of the carrier bottom 102.

An adhesive region 131 is formed between a side wall outer side 137 which faces away from the battery carrier 100, and the carrier bottom 102. Seals 129 are materially bonded to the adhesive region 131, in order to fluidically seal the joining region 113. In the view shown in FIG. 4, only one seal 129 which is connected to an adhesive region 131 is represented.

Figure 5:
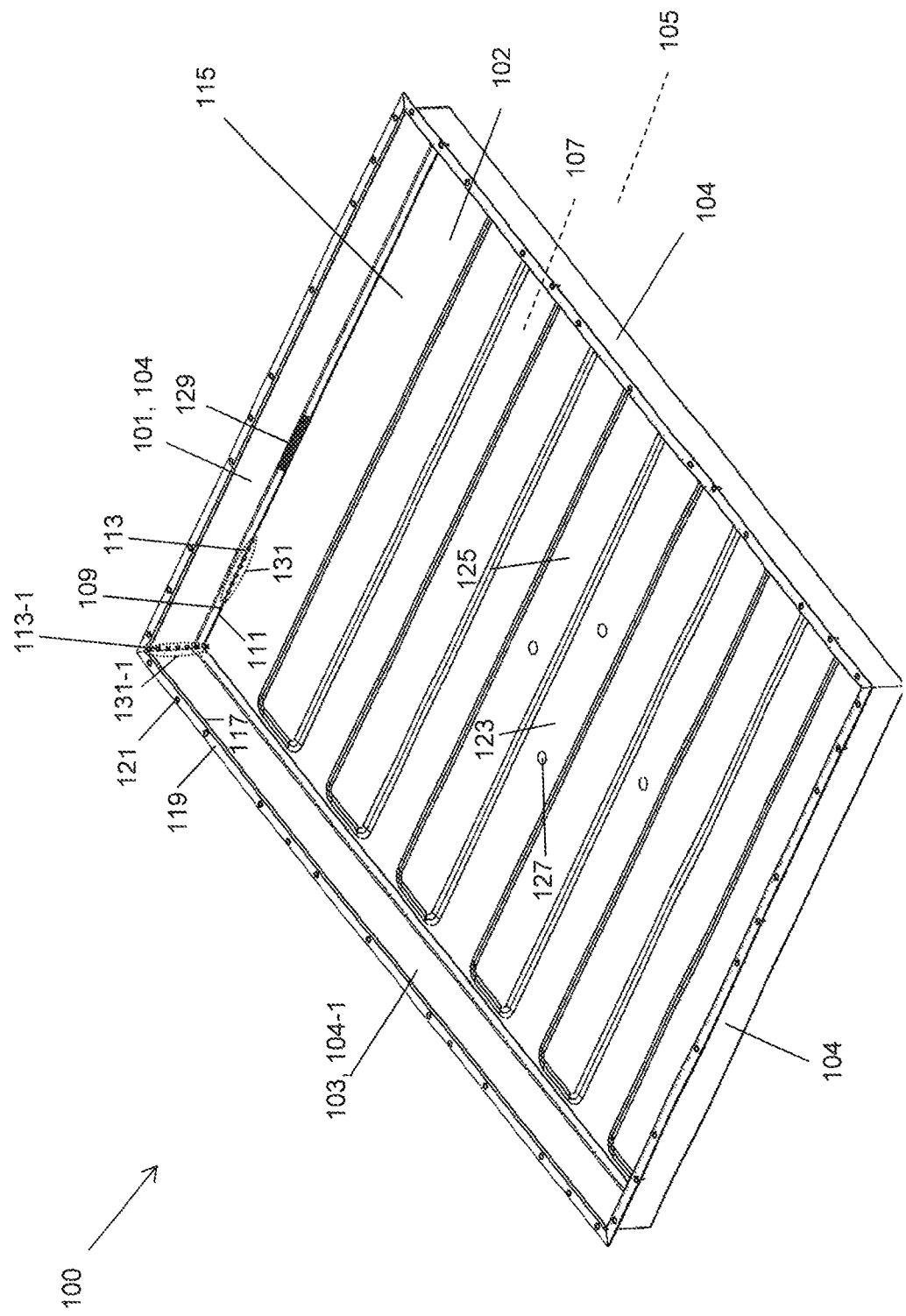
FIG. 5 shows a battery carrier in a cross-sectional view according to a fourth example.

FIG. 5 shows a battery carrier 100 in a cross-sectional view according to a fourth example. The battery carrier 100 according to the fourth example, which is represented in FIG. 5, corresponds to the battery carrier 100 according to the first example, which is represented in FIG. 1, except that the at least one first wall 101 comprises a side wall 104, that the at least one second wall 103 comprises an additional side wall 104-1, wherein the side wall 104 is joined to the additional side wall 104-1 by a joining region 113-1. In the joining region 113-1, an adhesive region 131-1 is formed, which is configured to condition the joining region 113-1 for a materially bonded connection to a seal 129-1. The seal 129-1 is materially bonded to the adhesive region 131, for fluidically sealing the joining region 113-1.

Thus, by means of the seal 129, an effective fluidic seal between the carrier bottom 102 and the side walls 104 can be ensured, and the seal 129-1 can ensure an effective mutual fluidic seal between the side walls 104, 104-1.

Figure 6:
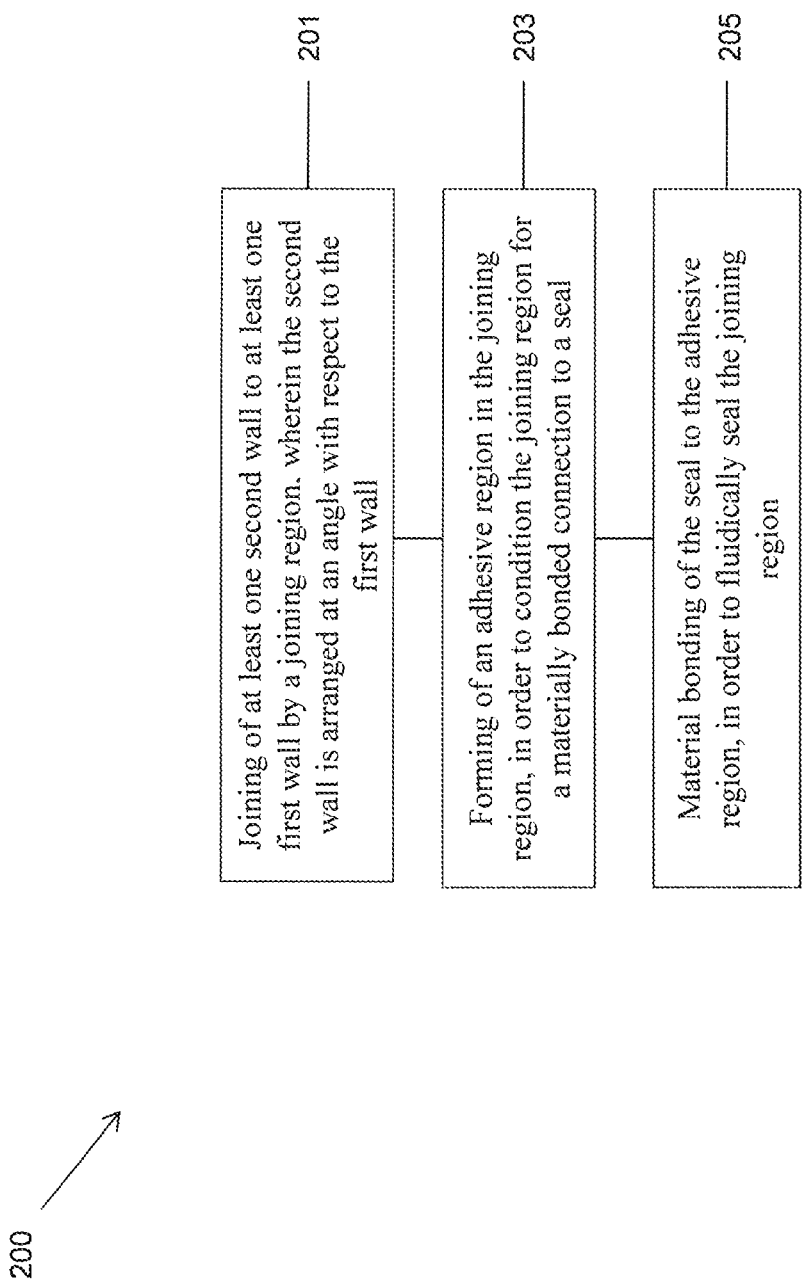
FIG. 6 shows a diagrammatic view of a method for producing a battery carrier.

FIG. 6 shows a diagrammatic view of a method 200 for producing a battery carrier 100 for accommodating at least one electric battery module in a vehicle. The method 200 comprises, as first step, the joining 201 of at least one second wall 103 to at least one first wall 101 by a joining region 113, wherein the second wall 103 is arranged at an angle with respect to the first wall 101. The method 200 comprises, as second step, the forming 203 of an adhesive region 131 in the joining region 113, in order to condition the joining region 113 for a materially bonded connection to a seal 129. The method 200 comprises, as third step, the material bonding 205 of the seal 129 to the adhesive region 131, in order to fluidically seal the joining region 113.

LIST OF REFERENCE NUMBERS

100 Battery carrier
101 First wall
102 Carrier bottom
103 Second wall
104 Side wall
105 Outer region of the battery carrier
107 Inner region of the battery carrier
109 Side wall lower side
111 Lateral bottom edge of the carrier bottom
113 Joining region
11-31 Joining region
115 Bottom upper side
117 Side wall upper side
119 Upper side flange
121 Opening
123 Recesses
125 Elevations
127 Additional opening
129 Seal
129-1 Seal
131 Adhesive region
131-1 Adhesive region
133 Flange
135 Side wall inner side
137 Side wall outer side
200 Method for producing a battery carrier
201 Joining of a second wall to a first wall
203 Forming of an adhesive region
205 Material bonding of a seal to the adhesive region

What is claimed is:
1. A battery carrier for accommodating at least one electric battery module in a vehicle, with:

at least one first wall comprising a carrier bottom or a carrier cover;

at least one second wall comprising at least one side wall, wherein the at least one second wall is arranged at a non-parallel angle with respect to the at least one first wall, wherein the second wall is joined to the first wall by a joining region and laterally limits the at least one first wall, wherein an adhesive region is formed in the joining region; and at least one seal materially bonded to the adhesive region to fluidically seal the joining region, wherein the adhesive region is configured to condition the joining region for a materially bonded connection to the at least one seal.

2. The battery carrier according to claim 1, further comprising:

at least one third wall comprising the carrier bottom or the carrier cover, different from the at least one first wall, wherein the at least one side wall laterally limits the at least one third wall, and wherein the at least one side wall is joined to the carrier bottom by the joining region.

3. The battery carrier according to claim 1, wherein the at least one side wall comprises a first side wall, wherein at least one second wall comprises at least an additional side wall, and wherein the first side wall is joined to the additional side wall by the joining region.

4. The battery carrier according to claim 1, wherein:

the adhesive region comprises an adhesive layer, wherein the adhesive layer comprises at least one of: a plastic layer, a silane layer, a metalorganic layer, a titanium-zirconium layer, and an anodized layer; and the adhesive region comprises one or more of: a plasma-cleaned region or a laser-cleaned region.

5. The battery carrier according to claim 1, wherein the joining region comprises a welded connection or a soldered connection.

6. The battery carrier according to claim 1, wherein the joining region comprises at least one of: a rivet connection, a screw connection, and a clinch connection.

7. The battery carrier according to claim 1, wherein the joining region comprises a joining connection between the at least one first wall and the at least one second wall, and wherein the adhesive region is formed on the joining connection.

8. The battery carrier according to claim 1, wherein the joining region is formed at least in sections between the at least one first wall and the at least one second wall.

9. The battery carrier according to claim 1, wherein the seal is formed from at least one elastomer, or from a single-component or a two-component melt or epoxy resin adhesive applied in the form of a paste.

10. The battery carrier according to claim 1, wherein the at least one second wall is formed with a side wall lower side, wherein the at least one first wall is formed as the carrier bottom with a bottom upper side, wherein the side wall lower side is placed onto the bottom upper side to connect the side wall to the carrier bottom.

11. The battery carrier according to claim 10, wherein the adhesive region is formed between the carrier bottom and a side wall inner side of the side wall that faces the battery carrier or between the carrier bottom and a side wall outer side of the side wall that faces away from the battery carrier.

12. The battery carrier according to claim 1, wherein the at least one second wall extends at a right angle with respect to the at least one first wall.

13. The battery carrier according to claim 1, wherein:

the at least one second wall or the at least one first wall, or both is/are formed as a single piece; or the at least one second wall or the at least one first wall, or both, comprise(s) aluminum.

14. The battery carrier according to claim 1, wherein the at least one first wall comprises the carrier bottom, wherein the side wall frame comprises at least four side walls that laterally limit the carrier bottom and are joined to the carrier bottom by joining regions, wherein the joining regions includes the joining region, wherein the adhesive region is formed in the joining regions that is configured to condition the respective joining region, and wherein the battery carrier comprises at least four seals.

15. A method for producing a battery carrier for accommodating at least one electric battery module in a vehicle, wherein the method comprises:

joining of at least one second wall comprising at least one side wall to at least one first wall by a joining region, wherein the second wall is arranged at a non-parallel angle with respect to the first wall, wherein the at least one first wall comprises a carrier bottom or a carrier cover, and wherein the at least one second wall laterally limits the at least one first wall;

forming of an adhesive region in the joining region to condition the joining region for a materially bonded connection to a seal, and material bonding of the seal to the adhesive region to fluidically seal the joining region.

16. The method according to claim 15, further comprising:

applying an adhesive layer in the joining region to form the adhesive region, and wherein the adhesive layer comprises at least one of: a plastic layer, a silane layer, a metalorganic layer, a titanium-zirconium layer, and an anodized layer.

17. The method according to claim 15, further comprising:

forming the adhesive region in the joining region by one or more of: plasma cleaning method or laser cleaning.

18. A battery carrier for accommodating at least one electric battery module in a vehicle, with:

at least one first wall configured as a carrier bottom;

at least one second wall arranged at a non-parallel angle with respect to the first wall, wherein the second wall is joined to the first wall by a joining region, wherein an adhesive region is formed in the joining region, and the adhesive region is configured to condition the joining region for a materially bonded connection to a seal; and at least one seal materially bonded to the adhesive region to fluidically seal the joining region, wherein the second wall is configured as a side wall with a side wall inner side, wherein a flange is arranged on the side wall inner side, wherein the carrier bottom is placed onto the flange to connect the side wall to the carrier bottom, and wherein the adhesive region is formed between the carrier bottom and the side wall inner side that faces the battery carrier.

19. The battery carrier according to claim 18, wherein the adhesive region comprises an adhesive layer, wherein the adhesive layer comprises at least one of: a plastic layer, a silane layer, a metalorganic layer, a titanium-zirconium layer, and an anodized layer, and wherein the adhesive region comprises one or more of: a plasma-cleaned region or a laser-cleaned region.

20. The battery carrier according to claim 18, wherein the seal is formed from at least one elastomer, or from a single-component or a two-component melt or epoxy resin adhesive applied in the form of a paste.

* * * * *